United States Patent [19]
Turner

[11] Patent Number: 5,202,178
[45] Date of Patent: Apr. 13, 1993

[54] HIGH-STRENGTH NYLON BATTERY SEPARATOR MATERIAL AND RELATED METHOD OF MANUFACTURE

[75] Inventor: Larry Turner, Cumberland, R.I.

[73] Assignee: International Paper Company, Purchase, N.Y.

[21] Appl. No.: 843,709

[22] Filed: Feb. 28, 1992

[51] Int. Cl.$^5$ ............................................. B32B 27/34
[52] U.S. Cl. .................................. 428/287; 156/306.6; 156/308.2; 428/284; 428/296; 428/297; 428/298; 428/282; 429/247; 429/249; 429/254
[58] Field of Search ............... 428/284, 287, 296, 298, 428/297, 282; 429/247, 249, 254; 156/308.2, 313, 306.6

[56] References Cited

U.S. PATENT DOCUMENTS

| | | | |
|---|---|---|---|
| 3,595,731 | 7/1971 | Davies et al. | 428/296 |
| 3,770,562 | 11/1973 | Newman | 428/297 |
| 4,039,711 | 8/1977 | Newman | 428/296 |
| 4,863,785 | 9/1989 | Berman et al. | 428/298 |
| 5,089,360 | 2/1992 | Kanno et al. | 428/296 |

Primary Examiner—James J. Bell
Attorney, Agent, or Firm—Ostrager, Chong & Flaherty

[57] ABSTRACT

A nylon battery separator material for use in nickel-cadmium batteries has a laminated construction comprising a nonwoven web of nylon staple fibers sandwiched between a pair of webs of spun-bonded nylon fibers. The staple web comprises nylon 6 and nylon 6-6 fibers. The spun-bonded fibers are nylon 6-6. During manufacture the staple web is fed between the webs of spun-bonded nylon fibers. The three webs form a sandwich which is passed through a stack of heated calendar rolls. The maximum temperature of the stack of calendar rolls is greater than the softening temperature of the nylon 6 fibers, but less than the melting temperature of the nylon 6-6 fibers. Upon cooling, the webs of spun-bonded fibers will be bonded to the staple web by the re-solidified nylon 6 fibers, whereby the laminated battery separator material is formed.

27 Claims, 1 Drawing Sheet

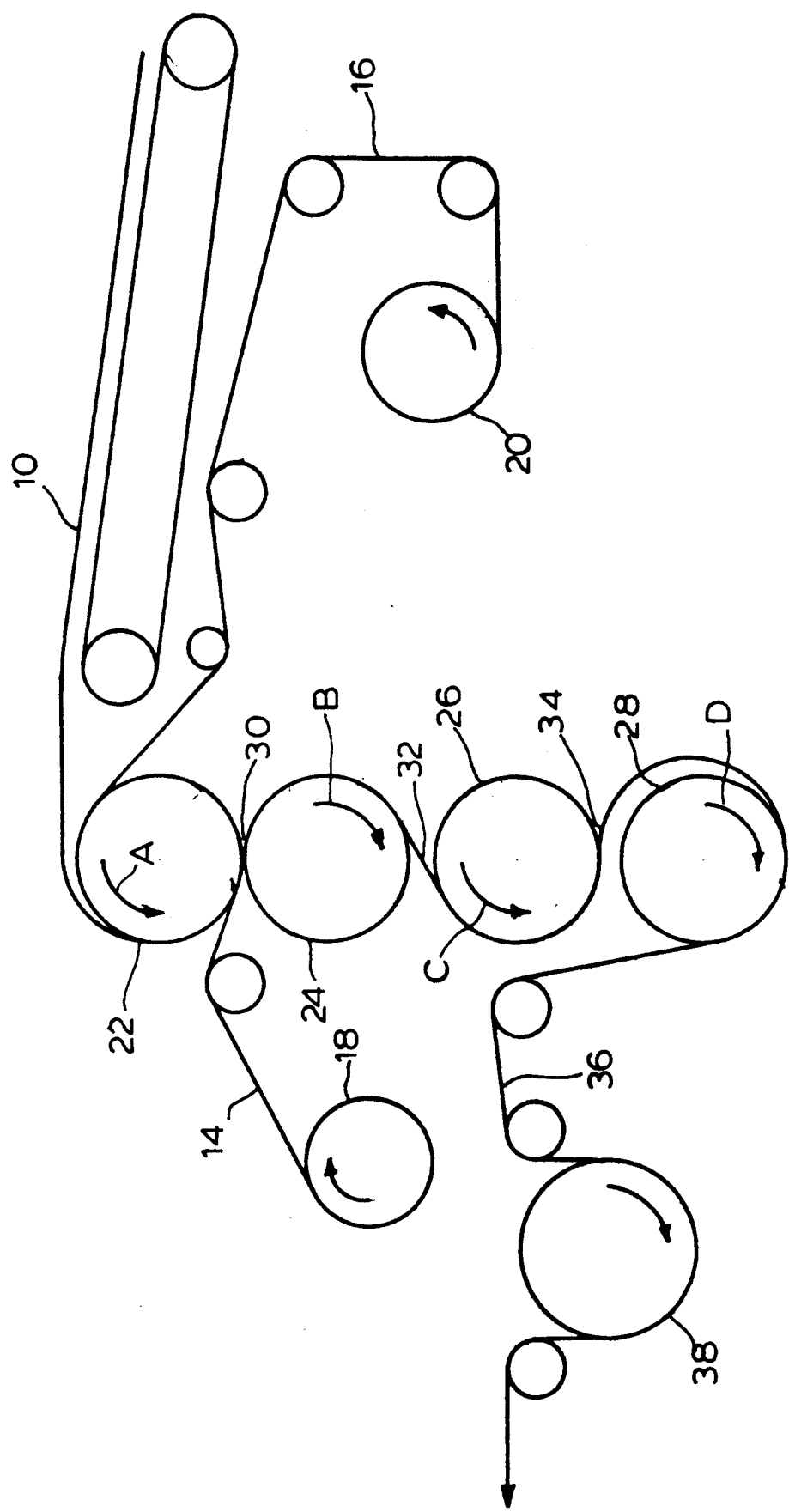

HIGH-STRENGTH NYLON BATTERY SEPARATOR MATERIAL AND RELATED METHOD OF MANUFACTURE

DESCRIPTION

Field of the Invention

This invention generally relates to an improved battery separator material for use in nickel-cadmium and other metal hydride batteries and a method of manufacturing such a separator material. In particular, the invention relates to a highly porous and highly elastic laminated structure made of fibrous material, such as nylon, which is useful as separator material. The laminated construction in accordance with the invention is a nonwoven web of nylon staple fibers sandwiched between and thermal bonded to a pair of sheets of nylon spun-bonded fabric.

Background of the Invention

Nickel cadmium batteries generally consist of a wound anode interleaved with a wound cathode, the wound anode and cathode being spaced apart at regular intervals in an electrolyte. The interval between the anode and cathode may be as small as 0.05 mm. Although it is desirable to place the cathode and anode close together to increase the load capacity of the battery, the electrodes must not touch to avoid producing a short circuit. To accomplish this end, separators made of suitable material are arranged between the anode and cathode to keep them apart. The separator material must be inert to the electrolyte and to the reactions occurring at the surfaces of the electrodes.

In addition, the separator material should be sufficiently elastic to conform to the shape of the electrode surfaces. Also the separator material should be sufficiently porous to allow unimpeded migration of ions between the electrodes, yet be able to filter out solid particles which separate from the electrodes and attempt to pass through the separator. The separator material further must be wettable by the liquid electrolyte to prevent the establishment of dry areas on the separator fabric. Finally, the separator should have the capacity to adsorb and store the liquid electrolyte.

Separator material made from woven fabric is disadvantageous because fabric stores insufficient quantities of the liquid electrolyte. Furthermore, because pores formed between the warp and weft of the fabric are large, solid particles which dislodge from the electrodes can pass through the fabric. Such particles accrete until a bridge is formed between an anode and cathode, giving rise to a short-circuit in the battery.

It is known in the prior art that the foregoing disadvantages can be overcome by providing a battery separator material made from nonwoven nylon fabric. U.S. Pat. No. 3,344,013 to Fahrbach discloses a separator material for batteries comprising a highly porous and highly elastic structurally modified nonwoven fibrous material consisting of either nylon 6 (i.e., polycaprolactum) fibers or nylon 6-6 (i.e., polyamide) fibers or both. The separator material is manufactured by impregnating the fibrous material with a solvent consisting of a low-percentage aqueous salt solution to effect preliminary dissolution of the surface portions of nylon fibers. The impregnated nonwoven material is then squeezed under light pressure to remove excess salt solution therefrom and to initially strengthen the nonwoven material by fusing the fibers to each other at their superficially dissolved surface portions. Then the nonwoven material is dried and finally strengthened by heating.

In accordance with one preferred embodiment disclosed in U.S. Pat. No. 3,344,013, the nonwoven material consists of randomly oriented nylon 6 textile fibers having a staple length of 30 to 80 mm. In accordance with another embodiment disclosed in that patent, the nonwoven material consists of randomly oriented nylon 6-6 textile fibers having a staple length of 30 to 60 mm. In addition, U.S. Pat. No. 3,344,013 discloses that the nonwoven material may be spun-bonded fabric consisting of "endless" (i.e., having a median fiber length of about 100 mm) nylon 6 and/or nylon 6-6 filaments. When the endless fibers are bonded at their points of contact, a nonwoven material is obtained having a stable structure of high strength, porosity and elasticity.

According to U.S. Pat. No. 3,344,013, the spun-bonded nonwoven separator material disclosed therein exhibits good resistance to liquid electrolytes and to electrochemical oxidation, possesses good wettability upon contact with electrolytes and good filtration capacity for solid particles present in the electrolyte, has the capacity to adsorb and store electrolyte liquids, and is suitable for use in an alkaline battery.

U.S. Pat. No. 3,344,013 further states that the nonwoven separator material disclosed therein could be prepared by superimposing multiple individual thinner webs of intermingled fibers or by making a thicker single-layer web. Individual nonwoven webs may be prepared by carding using conventional carding rolls. If carded webs are to be used, multiple thin webs are superimposed at an angle with respect to the principal direction of fibers in individual webs, thereby obtaining a multitude of crossing points for the fibers.

While U.S. Pat. No. 3,344,013 recognized the advantages of making battery separator material from nonwoven nylon fiber and disclosed that the battery separator material could comprise a plurality of webs laminated together, it nowhere recognized the advantages achievable by laminating webs of different fiber composition. Moreover, this patent failed to recognize that nylon 6 is more strongly affected by strong alkaline solutions such as potassium hydroxide than is nylon 6-6. The result of this stronger interaction is that nylon 6-6 resists decomposition in KOH solution better than nylon 6 does.

SUMMARY OF THE INVENTION

An object of the present invention is to overcome the aforementioned shortcomings of the prior art nonwoven battery separator material made of nylon fibers. In particular, it is an object of the present invention to provide a nylon nonwoven battery separator material which has lower nylon 6 content than conventional battery separator material and therefore better resists decomposition in KOH solution.

Another object of the invention is to provide a highly porous and highly elastic laminated structure made of nonwoven nylon fibrous material which has increased strength and is useful as separator material. In particular, the strength of the material in accordance with the invention is enhanced in the cross direction, thereby facilitating winding up of the fabric on a winder.

A further object of the invention is to provide a nylon nonwoven battery separator material of laminated construction which can be manufactured easily and inexpensively. In particular, the nylon nonwoven battery separator material of laminated construction in accordance with the invention incorporates commercially available sheets of spun-bonded nylon fiber, thereby simplifying the manufacturing process and reducing the amount of capital investment required to set up a production line.

It is also an object of the invention to provide a nylon nonwoven battery separator material of laminated construction in which one layer has a property which is enhanced and another layer of different fiber composition has a different property enhanced. The result is a battery separator material having both enhanced properties. For example, one layer provides an enhanced filtering capacity while another layer provides enhanced strength.

A further object of the invention is provide a battery separator material of laminated construction in which the enhanced properties are balanced. This is accomplished by sandwiching a layer with one enhanced property between two identical layers having a different enhanced property.

In the present invention, these objects, as well as other objects which will be apparent from the detailed description which follows, are achieved generally by laminating a nonwoven web of nylon 6 and nylon 6-6 staple fibers between a pair of nonwoven webs of spun-bonded nylon 6-6 fibers by thermal bonding.

In accordance with the preferred embodiment of the invention, the amount of nylon 6 in the nylon staple web may be in the range of 5–60 wt. % with the remainder being nylon 6-6 fibers. In accordance with another embodiment, bicomponent fibers having a nylon 6 sheath and a nylon 6-6 core could be without nylon 6 fibers. The amount of bicomponent fibers in the nylon staple web may be in the range of 10–100 wt. % with the remainder being nylon 6-6 fibers. In addition, any combination of nylon 6, nylon 6-6 and bicomponent fibers can be used provided that the final proportion of nylon 6 material in the staple web lies in the range of 5–60 wt. %.

Moreover, the composition of the staple web need not consist of 100% nylon fibers and may include polypropylene fibers in addition to the nylon. Other fibers such as polyester may be combined with the nylon fibers to obtain slightly different properties.

The spun-bonded webs, on the other hand, may be any one of a number of commercially available fabrics made entirely from spun-bonded nylon 6-6 fibers.

In accordance with the method of manufacture of the invention, the nylon staple web may be formed by superimposing three to eight carded layers of staple fibers on a conveyor. At the same time two spun-bonded nylon webs or sheets are unwound from rolls. The three webs are then fed together to calendar rolls with the staple web sandwiched between the spun-bonded webs. The nip loadings and calendar roll temperatures adjusted to achieve softening of the nylon 6 material as the sandwiched webs are calendared. Upon cooling of the laminate, the softened nylon 6 material re-solidifies and bonds to nylon 6-6 fibers in contact therewith, thereby bonding both spun-bonded sheets to the staple web.

Other objects, features and advantages of the present invention will be apparent when the detailed description of the preferred embodiments of the invention is considered in conjunction with the drawing.

BRIEF DESCRIPTION OF THE DRAWING

The preferred embodiments of the invention will be described in detail below with reference to the drawing, which is a diagrammatic view showing the calendaring process by which a nylon staple web is sandwiched between two spun-bonded nylon webs to form a laminated construction.

DETAILED DESCRIPTION OF THE PREFERRED EMBODIMENTS

Referring to the drawing, the nonwoven staple web 10 in accordance with the invention is manufactured via a conventional carding process. The number of cards used will vary depending on the desired thickness of the nylon staple web. In accordance with the invention, the nonwoven staple web comprises three to eight layers of staple fibers, necessitating the use of an equal number of cards. The cards are lined up in succession over a conveyor 12. Each card deposits a layer onto the conveyor. The superimposed layers form nonwoven staple web 10.

In accordance with the preferred embodiments of the invention, the nonwoven staple web 10 consists of 100% nylon fibers. The fiber composition of the staple web may include 5–60 wt. % nylon 6 staple fibers with the remainder being nylon 6-6 staple fibers. In accordance with one preferred embodiment, the ratio of nylon 6 to nylon 6-6 is 30:70. The nylon 6 and nylon 6-6 staple fibers can have a length of ⅜ to 2 inches, with a length of 1¼ to 1⅜ inches preferred. The nylon 6 staple fibers have a preferred fineness of about 1.0 denier or less, while the nylon 6-6 staple fibers have a preferred fineness of 0.5 to 1.2 denier.

As a result of the preferred fiber composition, the nylon staple web, when incorporated in the laminated battery separator material of the invention, constitutes a low-denier barrier which performs a filtration function by trapping solid particles which dislodge from the battery electrodes.

The spun-bonded webs may be any one of a number of fabrics commercially available under the trade name "Cerex". The fiber composition of Cerex fabrics is entirely nylon 6-6. The spun-bonded nylon 6-6 fibers have a fineness of 3.0–3.5 denier and are continuous. Cerex fabrics are commercially available from Fiberweb N.A., Inc. located in Charlotte, N.C.

Cerex fabrics resist attack by alkaline solutions such as those used in batteries. They have a melting point of approximately 500° F. and are dimensionally stable up to 400° F. Cerex fabrics can be processed at temperatures as high as 425° F. for limited periods of time.

In accordance with the preferred embodiment, Cerex fabric Type 23 is used. This fabric has a weight of 0.5 oz./yd$^2$ and an average thickness of 3.2 mils. Cerex Type 23 fabric is available on rolls.

Cerex Type 23 fabric has a high grab strength, i.e., 16 lbs. in the machine direction and 9 lbs. in the transverse direction as measured by ASTM D-1682-64. This high grab strength means that the laminate will better maintain its integrity during handling and positioning of the separator material inside the battery, whether it is gripped mechanically or by hand.

Other properties of Cerex Type 23 fabric include the following: tear strength—6.4 lbs. in the machine direction and 4.3 lbs. in the transverse direction as measured by ASTM D-1117-80; Mullen burst strength—15 psi as measured by ASTM D-3786-802; and air permeability—950 CFM/ft$^2$ as measured by ASTM D-737-75.

Alternative types of fabric which can be used include Types PBN II, 29 and 31. All of these are spun-bonded nylon 6-6 fabrics commercially available from Fiberweb N.A., Inc. PBN II is a point-bonded fabric; Type 29 is loosely bonded; and Type 31 uses trilobal nylon 6-6 fibers.

In accordance with the method of manufacture of the invention, the nylon staple web 10 and two nylon spun-bonded webs 14 and 16 are laminated by thermal bonding in a stack of heated calendar rolls 22, 24, 26, 28. The nylon spun-bonded webs 14 and 16 are unwound from rolls 18 and 20 respectively and threaded through the nips 30, 32 and 34 formed between the calendar rolls.

After the nylon staple web 10 is formed on the conveyor 12, it is deposited onto nylon spun-bonded web 16. webs 12 and 16 are then carried to nip 30 between calendar rolls 22 and 24 by rotation of calendar roll 22 in the direction indicated by arrow A. At an angular position on calendar roll 22 which is clockwise relative to nip 30 as seen in the drawing, the nylon spun-bonded web 14 is laid against the other side of staple web 10, whereby web 10 is sandwiched between spun-bonded webs 14 and 16.

Calendar rolls 22 and 24 are heated to a temperature in the range of 350° F. to 420° F., preferably 370° F.; calendar rolls 26 and 28 are heated to a temperature in the range of 370° F. to 430° F., preferably 415° F. As calendar rolls 22, 24, 26, and 28 respectively rotate in the directions indicated by arrows A, B, C and D, the web laminate is heated. As the web laminate travels through nips 30, 32 and 34 in succession, the webs are subjected to pressure to achieve nip loadings of under 800 pli. The loadings can be varied in dependence on the temperature of the calendar rolls, i.e., the loading may decrease as the temperature is increased. The calendar roll temperatures and nip loadings are selected to ensure that the nylon 6 fibers reach a temperature at which bonding can occur. This temperature need not be in excess of the melting temperature of nylon 6, i.e., 400° F., since nylon 6 gets tacky and plastic at temperatures below 400° F.

As a result of the application of heat and pressure in the stack of calendar rolls, the nylon staple web 10 is heated to a temperature above the softening point of nylon 6, but below the melting point of nylon 6-6, which is about 500° F. After the laminate 36 leaves calendar roll 28, it is brought into contact with chill roll 38, which rapidly reduces the temperature of the heated and compressed laminate. As the softened nylon 6 fibers re-solidify during cooling, the re-solidified nylon 6 material bonds with spun-bonded nylon 6-6 fibers in the spun-bonded webs 14 and 16 as well as with the nylon 6-6 staple fibers in staple web 10. As a result of this thermal bonding, the three webs are joined together to form the laminated battery separator material of the invention.

Various prototypes of the battery separator fabric of the invention were manufactured and tested. Using the same Cerex fabric, the weight of the laminated separator material can be adjusted by varying the number of layers of staple fiber making up the staple web. The prototype separators had fabric weights in the range of 50 to 90 gm/m$^2$. The thickness of the laminated separator material can be adjusted by varying the nip loadings. The prototype separators had thicknesses in the range of 0.16 to 0.25 mm.

The battery separator fabric absorbed an amount of potassium hydroxide electrolyte equal to 250 to 500% of the dry weight of the fabric. Other properties of the prototype separator materials include the following:

average fiber diameter—12.9-14.6 microns; void fraction—67-70%; Frazier permeability—18-59 m/min; strength—116-210 N/50 mm (MD) and 37-68 N/50 mm (CD yield strength (MD)—56-119 N/50 mm; and yield strain (MD)—3.3-5%.

Although the invention has been described with reference to preferred embodiments, it will be appreciated that it would be obvious to one of ordinary skill in the arts of fiber technology and the manufacture of battery separators that fibers other than nylon, e.g., polypropylene, could be added to the fiber composition without departing from the scope of the invention. All such variations and modifications are intended to be within the scope and spirit of the invention as defined in the claims appended hereto.

I claim:

1. A battery separator material having a laminated construction comprising a first nonwoven web of staple fibers sandwiched between second and third nonwoven webs of spun-bonded fibers.

2. The battery separator material as recited in claim 1, wherein at least some of said stable fibers comprise first thermoplastic material and at least some of said spun-bonded fibers comprise second thermoplastic material, said melting temperature of said second thermoplastic material having a melting temperature which is higher than the melting temperature of said first thermoplastic material.

3. The battery separator material as recited in claim 2, wherein said first thermoplastic material is nylon 6 and said second thermoplastic material is nylon 6-6.

4. The battery separator material as recited in claim 3, wherein said staple fibers comprise nylon 6 fibers and said spun-bonded fibers comprise nylon 6-6 fibers.

5. The battery separator material as recited in claim 4, wherein said staple fibers further comprise nylon 6-6 fibers.

6. The battery separator material as recited in claim 4, wherein 5 to 60 wt. % of said staple fibers are nylon 6 fibers and 40 to 95 wt. % of said staple fibers are nylon 6-6 fibers.

7. The battery separator material as recited in claim 3, wherein said staple fibers comprise bicomponent fibers having a nylon 6 sheath and a nylon 6-6 core and said spun-bonded fibers comprise nylon 6-6 fibers.

8. The battery separator material as recited in claim 7, wherein the material. % of said staple fibers are said bicomponent fibers.

9. The battery separator material as recited in claim 3, wherein the material making up said staple fibers consists of 5–60 wt. % nylon 6 and said spun-bonded fibers comprise nylon 6-6.

10. A battery separator material comprising a first nonwoven web of staple fibers sandwiched between second and third nonwoven webs of spun-bonded fibers, wherein at least some of said stable fibers comprise first thermoplastic material and at least some of said spun-bonded fibers comprise second thermoplastic material, said melting temperature of said second thermoplastic material having a melting temperature which is higher than the melting temperature of said first thermoplastic material, said second and third nonwoven webs being laminated to said first nonwoven web by heating said first thermoplastic material at least to a temperature at which said first thermoplastic material is softened without melting said second thermoplastic material and then cooling said first thermoplastic material such that portions of said first thermoplastic material bond to at least some of said spun-bonded fibers of said second and third nonwoven webs.

11. The battery separator material as recited in claim 10, wherein said first, second and third nonwoven webs are laminated together by calendaring at a temperature greater than the softening temperature of said first thermoplastic material but less than the melting temperature of said second thermoplastic material.

12. The battery separator material as recited in claim 11, wherein said first thermoplastic material is nylon 6 and said second thermoplastic material is nylon 6-6.

13. The battery separator material as recited in claim 12, wherein said staple fibers comprise nylon 6 fibers and said spun-bonded fibers comprise nylon 6-6 fibers.

14. The battery separator material as recited in claim 13, wherein said staple fibers further comprise nylon 6-6 fibers.

15. The battery separator material as recited in claim 12, wherein 5 to 60 wt. % of said staple fibers are nylon 6 fibers and 40 to 95 wt. % of said staple fibers are nylon 6-6 fibers.

16. The battery separator material as recited in claim 12, wherein said staple fibers comprise bicomponent fibers having a nylon 6 sheath and a nylon 6-6 core and said spun-bonded fibers comprise nylon 6-6 fibers.

17. The battery separator material as recited in claim 16, wherein 10 to 100 wt. % of said staple fibers are said bicomponent fibers.

18. The battery separator material as recited in claim 11, wherein the material making up said staple fibers consists of 5–60 wt. % nylon 6 and said spun-bonded fibers comprise nylon 6-6.

19. A method of manufacturing a battery separator material comprising a first nonwoven web of staple fibers sandwiched between second and third nonwoven webs of spun-bonded fibers, wherein at least some of said stable fibers comprise first thermoplastic material and at least some of said spun-bonded fibers comprise second thermoplastic material, said melting temperature of said second thermoplastic material having a melting temperature which is higher than the melting temperature of said first thermoplastic material, comprising the steps of:
sandwiching said first nonwoven web between said second and third nonwoven webs;
softening said first thermoplastic material without melting said second thermoplastic material; and
cooling said first thermoplastic material such that portions of said first thermoplastic material bond to at least some of said spun-bonded fibers of said second and third nonwoven webs.

20. The method of manufacturing a battery separator material as recited in claim 19, wherein said first, second and third nonwoven webs are laminated together by calendaring at a temperature greater than the softening temperature of said first thermoplastic material but less than the melting temperature of said second thermoplastic material.

21. The method of manufacturing a battery separator material as recited in claim 19, wherein said first thermoplastic material is nylon 6 and said second thermoplastic material is nylon 6-6.

22. The battery separator material as recited in claim 21, wherein said staple fibers comprise nylon 6 fibers and said spun-bonded fibers comprise nylon 6-6 fibers.

23. The battery separator material as recited in claim 22, wherein said staple fibers further comprise nylon-6-6 fibers.

24. The battery separator material as recited in claim 21, wherein 5 to 60 wt. % of said staple fibers are nylon 6 fibers and 40 to 95 wt. % of said staple fibers are nylon 6-6 fibers.

25. The battery separator material as recited in claim 21, wherein said staple fibers comprise bicomponent fibers having a nylon 6 sheath and a nylon 6-6 core and said spun-bonded fibers comprise nylon 6-6 fibers.

26. The battery separator material as recited in claim 25, wherein 10 to 100 wt. % of said staple fibers are said bicomponent fibers.

27. The battery separator material as recited in claim 21, wherein the material making up said staple fibers consists of 5–60 wt. % nylon 6 and said spun-bonded fibers comprise nylon 6-6.

* * * * *